(12) United States Patent
Marski et al.

(10) Patent No.: US 9,740,765 B2
(45) Date of Patent: Aug. 22, 2017

(54) BUILDING NOMENCLATURE IN A SET OF DOCUMENTS WHILE BUILDING ASSOCIATIVE DOCUMENT TREES

(71) Applicant: International Business Machines Corporation, Armonk, NY (US)

(72) Inventors: Dirk Marski, Southampton (GB); Richard Martinus, Fareham (GB); Tom Waterton, Southampton (GB); James Withers, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 13/647,371

(22) Filed: Oct. 8, 2012

(65) Prior Publication Data

US 2014/0101121 A1    Apr. 10, 2014

(51) Int. Cl.
    *G06F 7/00* (2006.01)
    *G06F 17/30* (2006.01)
(52) U.S. Cl.
    CPC .............................. *G06F 17/30616* (2013.01)
(58) Field of Classification Search
    USPC ........................................................ 707/706
    See application file for complete search history.

(56) References Cited

U.S. PATENT DOCUMENTS

| | | | |
|---|---|---|---|
| 5,463,773 A | 10/1995 | Sakakibara et al. | |
| 6,452,607 B1 | 9/2002 | Livingston | |
| 7,539,988 B1 * | 5/2009 | Hersh | 718/100 |
| 8,082,492 B2 | 12/2011 | Hattori | |
| 8,099,663 B2 | 1/2012 | Mayor et al. | |
| 2004/0260683 A1 | 12/2004 | Chan et al. | |
| 2005/0066271 A1 | 3/2005 | Uchiyama et al. | |
| 2006/0271565 A1 | 11/2006 | Acevedo-Aviles et al. | |
| 2006/0288275 A1 | 12/2006 | Chidlovskii et al. | |
| 2007/0185858 A1 | 8/2007 | Lu et al. | |
| 2007/0244921 A1 * | 10/2007 | Blair | 707/102 |
| 2007/0271230 A1 | 11/2007 | Hart et al. | |

(Continued)

OTHER PUBLICATIONS

Kaufman, et al. Associative learning predicts intelligence above and beyond working memory and processing speed. Intelligence 37 (2009) 374-382.

(Continued)

*Primary Examiner* — Tony Mahmoudi
*Assistant Examiner* — Muluemebet Gurmu
(74) *Attorney, Agent, or Firm* — Steven M. Greenberg, Esq.; CRGO Law

(57) ABSTRACT

A method for topic discovery through structural knowledge in an associative document tree building system includes inserting a set of documents into nodes of a document tree, extracting a tag set of tags from the set of documents and inserting each tag into a different node of a tag tree. The method also includes conducting a search engine query using the tags of the extracted tag set to produce a new set of documents and inserting the new set of documents into nodes of the document tree. The method yet further includes extracting a new tag set of tags from the new set of documents and inserting each tag of the new tag set into a different node of the tag tree. Finally, the method includes displaying at least a portion of each of the document tree and tag tree in a user interface displayed.

20 Claims, 2 Drawing Sheets

(56) References Cited

U.S. PATENT DOCUMENTS

2008/0046441 A1* 2/2008 Wen et al. .................. 707/100
2010/0281030 A1* 11/2010 Kusumura et al. ........... 707/741
2011/0282878 A1 11/2011 Bird et al.

OTHER PUBLICATIONS

Miyahara, et al., "Discovery of Maximally Frequent Tag Tree Patterns in Semi Structured Data," Faculty of Info Sciences, Univ. of Hiroshima, 2001.

* cited by examiner

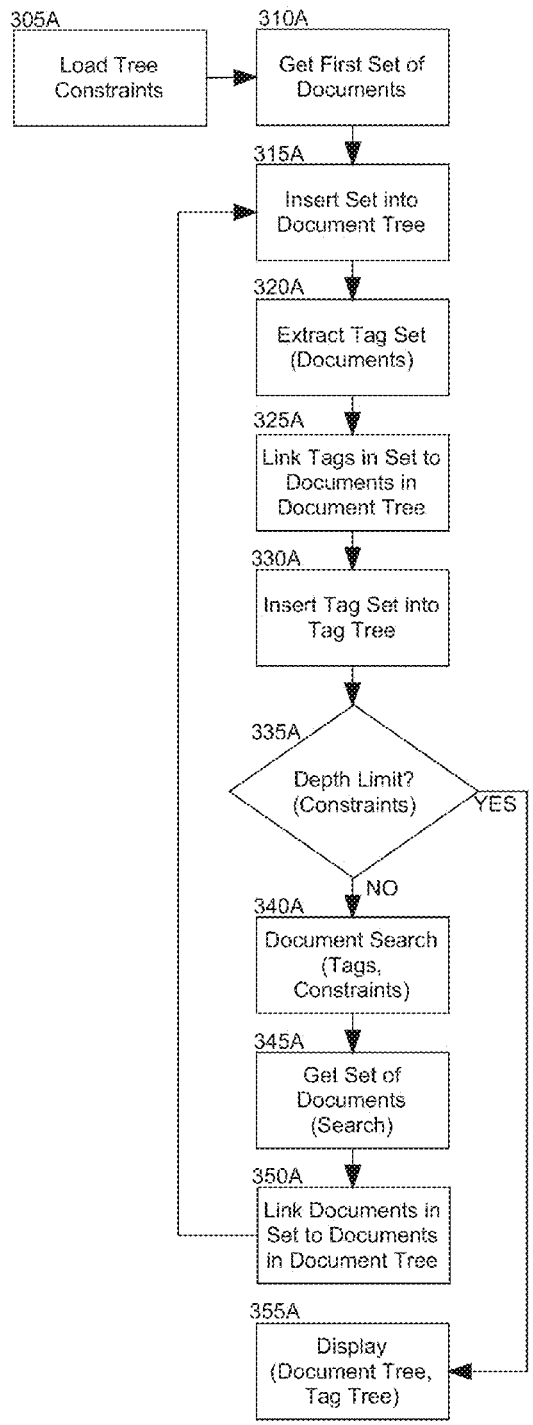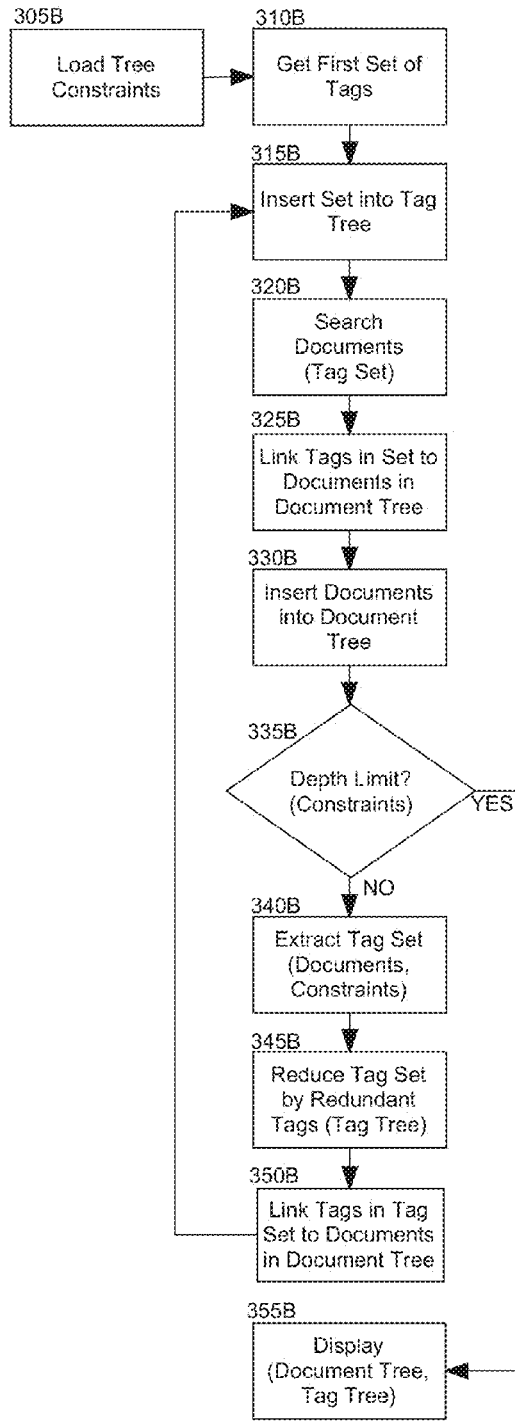
FIG. 3A
FIG. 3B

BUILDING NOMENCLATURE IN A SET OF DOCUMENTS WHILE BUILDING ASSOCIATIVE DOCUMENT TREES

BACKGROUND OF THE INVENTION

Field of the Invention

The present invention relates to topic discovery and more particularly to topic discovery through structural knowledge in an associative document tree building system.

Description of the Related Art

Topic discovery refers to the location of an index entry of content in a content repository or corpus of information. Learning a topic may be more successful when the associative links are established between a selected topic and other topics. These links can include differences or commonalities in the underlying topics. Of note, the curiosity of an end user is better satisfied and their understanding of a topic improved when a wider context of a selected topic is discovered. There are several methods of finding topics, including following hyperlinks between topic documents, making text-based queries to suggest topics, investigating a tree of topics, and invoking context-sensitive searching in which topics are suggested based upon the context of content already accessed by an end user.

Finding a topic of interest for content may require several iterations of a range of the foregoing methodologies with reference to a history of previously-viewed topics. So much can be time-consuming, complex and a frustrating process to perform. In the course of locating a topic of interest, the end user may need to refine previously submitted queries, improve an understanding of the desired topic, or change the terminology used. Some technical knowledge is also required to run effective searches—particularly query-based syntactical knowledge—as well as to recognize and use terms matching those associated with the desired help topics—namely domain-based knowledge.

To address the difficulties in finding a topic of interest, some software application help systems—a species of a topic discovery engine—have been made more effective by automatically exploring associative links between documents to present the wider context of a chosen topic. As described in Toru Takaki, Atsushi Fujii and Tesuya Ishikawa, *Associated Document Retrieval by Query Subtopic Analysis and its Application to Invalidity Patent Search*, presented at the Conference of Information Knowledge Management of the Association of Computing Machinery in 2004, associated document retrieval is a process in which a document is used as a long query to search for other similar documents. In non-associated document retrieval, by comparison, the end user must select each search term carefully whereas in associative document retrieval, the burden of search term selection is no longer present thereby improving the efficiency of a topic search by an end user.

BRIEF SUMMARY OF THE INVENTION

Embodiments of the present invention address deficiencies of the art in respect to topic discovery and provide a novel and non-obvious method, system and computer program product for topic discovery through structural knowledge in an associative document tree building system. In an embodiment of the invention, a method for topic discovery through structural knowledge in an associative document tree building system is provided. The method includes inserting a set of documents into nodes of a document tree in memory of a host computing system, extracting a tag set of tags from the set of documents and inserting each tag into a different node of a tag tree in the memory of the host computing system. The method also includes conducting a search engine query through the host computing system using the tags of the extracted tag set to produce a new set of documents and inserting the new set of documents into nodes of the document tree. The method yet further includes extracting a new tag set of tags from the new set of documents and inserting each of tag of the new tag set into a different node of the tag tree. Finally, the method includes displaying at least a portion of each of the document tree and tag tree in a user interface displayed by the host computing system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for topic discovery through structural knowledge in an associative document tree building system. In accordance with an embodiment of the invention, a set of documents produced by a topic search can be selected, for example a set of documents produced through context sensitive help or a set of documents produced from an initial keyword search. Thereafter, a pair of trees—a document tree and a tag tree—are created and populated respectively with references to the set of documents, and corresponding tags produced for the set of documents. The document subsequently can be expanded to include associated documents referenced by the initial set of documents and the tag tree can be expanded with tags produced for the associated documents referenced by the initial set of documents. Of import, each tag in the tag tree can include a logical link to one or more of the documents in the document tree. Conversely, each document in the document tree can include a logical link to one or more of the tags in the tag tree. In this way, topic discovery can be facilitated without requiring a burdensome manual query process dependent upon the knowledge of relevant nomenclature of associated documents.

Figure 1:
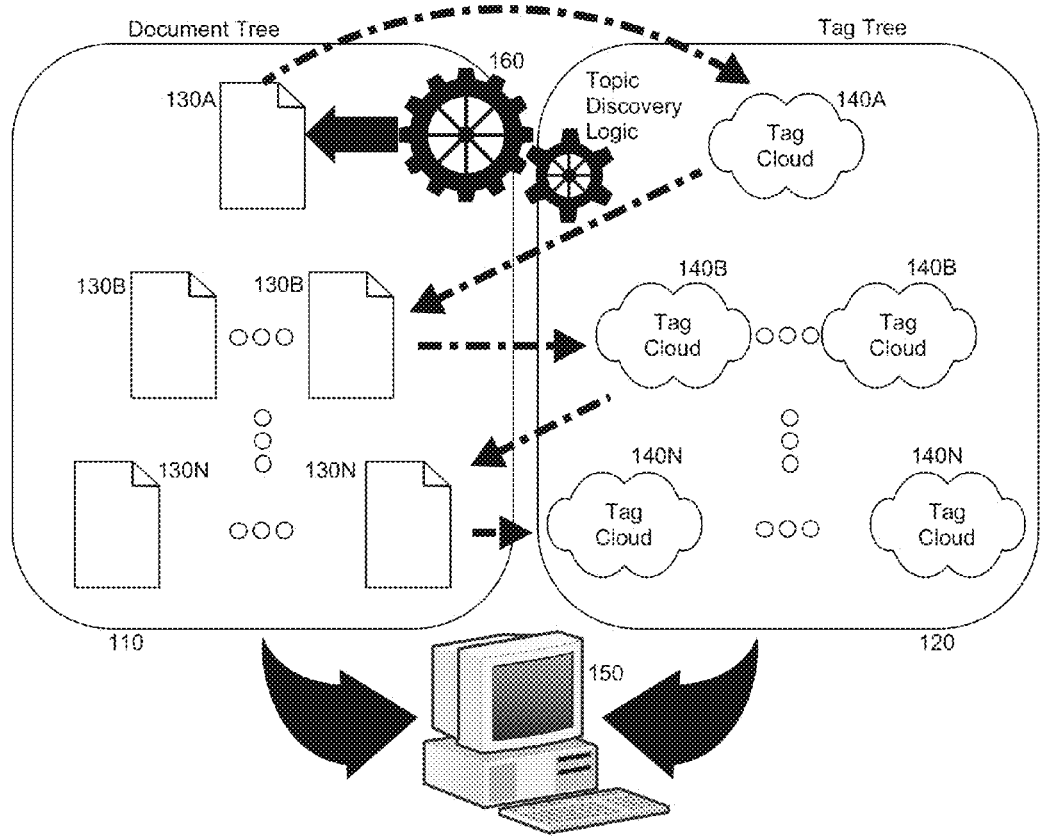
FIG. 1 is a pictorial illustration of a process for topic discovery through structural knowledge in an associative document tree building system.

In further illustration, FIG. 1 pictorially shows a process for topic discovery through structural knowledge in an associative document tree building system. As shown in FIG. 1, two different trees 110, 120 can be created—a document tree of associative documents 130A, 130B, 130N, and a tag tree of tags 140A, 140B, 140N. The tags 140A, 140B, 140N can be linked to corresponding ones of the documents 130A, 130B, 130N which in turn can be linked to one another where one of the documents 130A, 130B, 130N references another of the documents 130A, 130B, 130N. Topic discovery logic 160 can create both of the trees 110, 120 by creating a hierarchical tier in one of the trees 110, 120 using data in a corresponding hierarchical tier of the other of the trees 110, 120.

In this regard, either of the trees 110, 120 can be populated with an initial tier of either documents 130A or tags 140A as the case may be. In the circumstance of documents 130A, the results of a keyword search can be provided as the first tier of documents 130A, or a selection of documents referenced in an index can be provided as the first tier of documents 130A. Correspondingly, in the circumstance of tags 140A, a first tier of tags 140A can be provided through manual keying or by extracting the tags 140A from the results of a keyword search can be provided as the first tier of documents 130A, or a selection of documents referenced in an index.

Once a first tier 130A, 140A has been provided, the first tier 130A, 140A can be used to locate a candidate set for a second tier 130B, 140B. For instance, tags 140A of the first tier in the tag tree 120 can be used to conduct a document search to locate documents 130B of the second tier of the document tree 110. Correspondingly, documents 130A of the first tier of the document tree 110 can be used to extract tags 140B for the second tier of the tag tree 120. The number of documents 130B, 140B permitted to be added to the second tier can be limited by tree constraints for the trees 110, 120 and the number of tiers of the trees 110, 120 can be limited according to the tree constraints. For instance, a number of documents 130N added to a tier of the document tree 110 can be limited to only a specified number of most relevant documents 130N produced in consequence of a search using tags 140B of the tag tree 120.

Once the topic discovery logic 160 has created both the document tree 110 and the tag tree 120, both can be displayed in a user interface of a computer 150. Within the user interface, the end user view in the tags 140A, 140B, 140N of the tag tree 120 an appropriate nomenclature for the documents 130A, 130B, 130N of the document tree 110. Further, by selecting any one of the tags 140A, 140B, 140N in a display of the tag tree 120, corresponding implicated documents 130A, 130B, 130N of a display of the document tree 110 can be shown in the user interface. Conversely, a selection of any one of the documents 130A, 130B, 130N in a display of the document tree 110 can result in a corresponding display of implicated tags 140A, 140B, 140N in a display of the tag tree 120. As such, the end user can gain a fuller understanding of relevant topics resulting only from an initial seed set of documents 130A or tags 140A.

Figure 2:
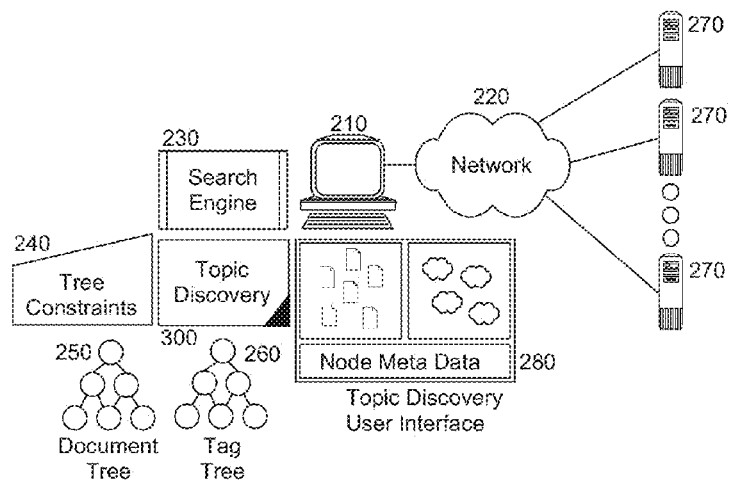
FIG. 2 is a schematic illustration of an associative document tree building data processing system configured for topic discovery through structural knowledge; and, FIGS. 3A and 3B, taken together, are a flow chart illustrating a process for topic discovery through structural knowledge in an associative document tree building system.

The process described in connection with FIG. 1 can be implemented within an associative document tree building data processing system. In yet further illustration, FIG. 2 schematically shows an associative document tree building data processing system configured for topic discovery through structural knowledge. The system can include a host computing system 210 that can include one or more computers each with memory and at least one processor. The host computing system 210 can be configured for communicative coupling to different content sources 270 over computer communications network 220, for example the global Internet. A search engine 230 can execute in the memory of the host computing system 210 can act to retrieve documents from the content sources 270 utilizing keyword queries.

Of note, a topic discovery module 300 can be coupled to the search engine 230. The topic discovery module 300 can include program code that when executed in the memory of the host computer system 210 can be enabled to build and expand a document tree 250 and a tag tree 260 according to depth and breadth constraints 240. The program code of the topic discovery module 300 further can be enabled to display all or a portion of each of the document tree 250 and the tag tree 260 in a user interface 280. The user interface 280 can provide an interactive display of both trees 250, 260 such that a selection of a node in the document tree 250 can result in a display of tags in the tag tree 260 linked to a document in the selected node of the document tree 250. Likewise, the selection of a tag in the tag tree 260 can result in a display in the user interface 280 of associated documents of the document tree 250. Further, meta-data can be displayed in the user interface 280 for a selected node, such as the frequency of occurrence of a corresponding tag in connection with all documents in the document tree 250.

In even yet further illustration of the operation of the topic discovery module 300, FIGS. 3A and 3B, taken together, are a flow chart illustrating a process for topic discovery through structural knowledge in an associative document tree building system. FIG. 3A illustrates a document-centric population of the trees, whereas FIG. 3B illustrates a tag-centric population of the trees, though any combination can be effective for any tier of the tiers in application. Considering first the document-centric approach, beginning in block 305A of FIG. 3A, a set of depth and breadth constraints can be loaded for each of the document and tag trees and in block 310A a first set of documents can be retrieved in accordance with the breadth constraints for insertion into the document tree in block 315A. In block 320A, a set of tags can be extracted from the first set of documents in accordance with the breadth constraints and linked to the documents in the first set in block 325A. Thereafter, in block 330A, the extracted tag set can be inserted into the tag tree completing the initial population of both the document and tag trees.

In decision block 335A, it can be determined if the depth constraints of the trees permits the population of a new tier of tags and documents. If so, in block 340A, a new document search can be initiated using the tags extracted from the first tier of documents. In block 345A, the set of documents produced by the search can be limited by the breadth constraints and in block 350A, individual documents in the retrieved and limited set of documents can be linked to other documents already existent in the tree where referenced by the individual documents. Thereafter, in block 315A the limited set of documents can be added into the document tree and a set of tags therefore extracted therefrom in block 320A. Finally, in block 325A, the extracted tags can be linked to the documents in the document tree and inserted into the tag tree in block 330A. In decision block 335A, it again can be determined if the depth constraints of the trees permits the population of yet a new tier of tags and documents. If so, the process can return yet again to block 340A. Otherwise, in block 355A at least a portion of each tree can be displayed in a user interface for use by the end user in discovering the nomenclature of the documents in an associative document tree.

Turning now to FIG. 3B, a tag-centric approach to populating the document tree and tag tree is illustrated therein. Beginning in block 305B, a set of depth and breadth constraints can be loaded for each of the document and tag trees and in block 310B a first set of tags can be retrieved in accordance with the breadth constraints for insertion into the tag tree in block 315B. In block 320B, a set of documents can be located by way of a search engine query based upon the tags the results thereof being limited in accordance with the breadth constraints, and in block 325B, the resultant documents can be linked to the tags in the tag tree. Thereafter, in block 330B, the retrieved documents can be inserted into the document tree completing the initial population of both the document and tag trees.

In decision block 335B, it can be determined if the depth constraints of the trees permits the population of a new tier of tags and documents. If so, in block 340B, a new set of tags can be extracted from the documents in the first tier of documents. In block 345B, the set of tags extracted from the documents can be limited by the breadth constraints and in block 350B, individual documents in the document tree can be linked to the tags in the new tag set. Thereafter, in block 315B the new set of tags can be added into the tag tree and a new set of documents retrieved in accordance thereof in block 320B. Finally, in block 325B, the retrieved documents can be linked to the tags in the tag tree and inserted into the document tree in block 330B. In decision block 335B, it again can be determined if the depth constraints of the trees permits the population of yet a new tier of tags and documents. If so, the process can return yet again to block 340B. Otherwise, in block 355B at least a portion of each tree can be displayed in a user interface for use by the end user in discovering the nomenclature of the documents in an associative document tree.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for topic discovery through structural knowledge in an associative document tree building system, the method comprising:
    inserting a set of documents into nodes of a document tree in memory of a host computing system;
    extracting a tag set of tags from the set of documents and inserting each tag into a different node of a tag tree in the memory of the host computing system;
    conducting a search engine query through the host computing system using the tags of the extracted tag set to produce a new set of documents;
    inserting the new set of documents into nodes of the document tree;
    extracting a new tag set of tags from the new set of documents and inserting each of tag of the new tag set into a different node of the tag tree; and,
    displaying at least a portion of each of the document tree and tag tree in a user interface displayed by the host computing system.

2. The method of claim 1, wherein the insertion of the sets of documents into the document tree is limited by breadth constraints of the document tree.

3. The method of claim 1, wherein the insertion of the tag sets of tags into the tag tree is limited by breadth constraints of the tag tree.

4. The method of claim 1, wherein the conduct of the search engine query, the insertion of the new set of documents resulting from the search engine query, and the extraction and insertion of the new tag set of tags from the new set of documents into nodes of the tag tree repeats until a depth constraint for each of the trees is met.

5. The method of claim 1, wherein meta-data for a selected node of a corresponding tree in the user interface is displayed in the user interface.

6. A method for topic discovery through structural knowledge in an associative document tree building system, the method comprising:
    inserting tags of a tag set into nodes of a tag tree in memory of a host computing system;
    conducting a search engine query through the host computing system using the tags of the tag set to produce a set of documents and inserting each document in the set of documents into a corresponding node of a document tree in the memory of the host computing system;
    extracting a new tag set of tags from the set of documents and inserting each tag of the new tag set into a different node of the tag tree;
    conducting a new search engine query through the host computing system using the tags of the new tag set of tags to produce a new set of documents;
    inserting the new set of documents into respectively different nodes of the document tree; and,
    displaying at least a portion of each of the document tree and tag tree in a user interface displayed by the host computing system.

7. The method of claim 6, wherein the insertion of the sets of documents into the document tree is limited by breadth constraints of the document tree.

8. The method of claim 6, wherein the insertion of the sets of tags into the tag tree is limited by breadth constraints of the tag tree.

9. The method of claim 6, wherein the conduct of the search engine queries, the insertion of a new set of documents resulting from the search engine queries, and the extraction and insertion of new tag sets of tags from the new set of documents into nodes of the tag tree repeats until a depth constraint for each of the trees is met.

10. The method of claim 6, wherein meta-data for a selected node of a corresponding tree in the user interface is displayed in the user interface.

11. A computer program product for topic discovery through structural knowledge in an associative document tree building system, the computer program product comprising:
    a computer readable storage medium comprising a device having computer readable program code embodied therewith, the computer readable program code comprising:

computer readable program code for inserting a set of documents into nodes of a document tree;

computer readable program code for extracting a tag set of tags from the set of documents and inserting each tag into a different node of a tag tree;

computer readable program code for conducting a search engine query using the tags of the extracted tag set to produce a new set of documents;

computer readable program code for inserting the new set of documents into nodes of the document tree;

computer readable program code for extracting a new tag set of tags from the new set of documents and inserting each of tag of the new tag set into a different node of the tag tree; and, computer readable program code for displaying at least a portion of each of the document tree and tag tree in a user interface.

12. The computer program product of claim 11, wherein the insertion of the sets of documents into the document tree is limited by breadth constraints of the document tree.

13. The computer program product of claim 11, wherein the insertion of the tag sets of tags into the tag tree is limited by breadth constraints of the tag tree.

14. The computer program product of claim 11, wherein the conduct of the search engine query, the insertion of the new set of documents resulting from the search engine query, and the extraction and insertion of the new tag set of tags from the new set of documents into nodes of the tag tree repeats until a depth constraint for each of the trees is met.

15. The computer program product of claim 11, wherein meta-data for a selected node of a corresponding tree in the user interface is displayed in the user interface.

16. A computer program product for topic discovery through structural knowledge in an associative document tree building system, the computer program product comprising:

a computer readable storage medium comprising a device having computer readable program code embodied therewith, the computer readable program code comprising:

computer readable program code for inserting tags of a tag set into nodes of a tag tree;

computer readable program code for conducting a search engine query using the tags of the tag set to produce a set of documents and inserting each document in the set of documents into a corresponding node of a document tree;

computer readable program code for extracting a new tag set of tags from the set of documents and inserting each tag of the new tag set into a different node of the tag tree;

computer readable program code for conducting a new search engine query using the tags of the new tag set of tags to produce a new set of documents;

computer readable program code for inserting the new set of documents into respectively different nodes of the document tree; and, computer readable program code for displaying at least a portion of each of the document tree and tag tree in a user interface.

17. The computer program product of claim 16, wherein the insertion of the sets of documents into the document tree is limited by breadth constraints of the document tree.

18. The computer program product of claim 16, wherein the insertion of the sets of tags into the tag tree is limited by breadth constraints of the tag tree.

19. The computer program product of claim 16, wherein the conduct of the search engine queries, the insertion of a new set of documents resulting from the search engine queries, and the extraction and insertion of new tag sets of tags from the new set of documents into nodes of the tag tree repeats until a depth constraint for each of the trees is met.

20. The computer program product of claim 16, wherein meta-data for a selected node of a corresponding tree in the user interface is displayed in the user interface.

\* \* \* \* \*